United States Patent [19]

Morgan

[11] 4,020,233

[45] Apr. 26, 1977

[54] HEAT ACTIVATED ETHYLENICALLY UNSATURATED-POLYTHIOL COMPOSITIONS

[75] Inventor: Charles Robert Morgan, Brookeville, Md.

[73] Assignee: W. R. Grace & Co., New York, N.Y.

[22] Filed: Jan. 22, 1976

[21] Appl. No.: 651,365

[52] U.S. Cl. .......................... 428/419; 204/159.23; 260/79; 260/77.5 R; 260/609 R; 260/609 B; 427/44; 427/385 A; 427/388 R
[51] Int. Cl.² ........................................ B32B 27/06
[58] Field of Search ............ 260/79, 609 R, 609 B; 204/159.23; 428/419; 427/44, 385 A, 388 R

[56] References Cited

UNITED STATES PATENTS

| 3,637,419 | 1/1972 | Lundsager | 204/159.23 |
| 3,662,023 | 5/1972 | Kehr et al. | 260/858 |

Primary Examiner—Melvyn I. Marquis
Attorney, Agent, or Firm—Richard P. Plunkett; William W. McDowell, Jr.

[57] ABSTRACT

This invention is directed to heat-activated compositions comprising ethylenically unsaturated compounds, e.g., monomers and/or prepolymers in combination with a polythiol and a catalytic amount of substituted or unsubstituted pinacol. The resulting heat-activated product can be utilized as coatings, gaskets, sealants, resists and the like.

11 Claims, No Drawings

HEAT ACTIVATED ETHYLENICALLY UNSATURATED-POLYTHIOL COMPOSITIONS

This invention is directed to heat-activated compositions. More particularly, this invention relates to heat-activated compositions comprising ethylenically unsaturated monomers and/or prepolymers in combination with a polythiol and catalytic amounts of substituted or unsubstituted pinacol.

It is known to carry out interrupted polymerization of compounds which contain polymerizable double bonds by heating said compound with a substituted ethane polymerization catalyst, cooling to interrupt the reaction and, when desired, reheating to continue the polymerization reaction. See U.S. Pat. No. 3,378,533. It is also known from U.S. Pat. No. 3,313,863 to produce molded articles by heating storable masses of unsaturated polyesters with conventional copolymerizable monomeric compounds and a substituted ethane catalyst. However, neither of the prior patents teach the addition of a thiol to an ethylenically unsaturated compound by a substituted ethane catalyst.

It is further known from Britist Pat. No. 1,041,040 to prepolymerize unsaturated polyester moulding masses to the gel stage by moderate heating in the presence of a substituted ethane polymerization catalyst and in the presence of gellers or activators such as mixtures of amine salts and mercaptans. However, the addition of these mono mercaptans with amine salt activators render the masses unstable at ambient or moderate temperatures, thereby greatly reducing shelf life.

Additionally, it is known from U.S. Pat. No. 3,662,023 to produce cured polythioethers from polyene polythiol compositions in the presence of conventional chemical free radical generators such as organic peroxides and azo compounds. The addition of these conventional chemical free radical generators to the system is only performed just prior to use since on addition the system commences curing even under ambient conditions.

One object of the instant invention is to produce adducts, chain-extended or cured products from a composition activated by heat. Another object of the this invention is to produce adducts, chain-extended or cured products by heating a composition followed by the application of U.V. radiation. Another object of this invention is to produce adducts, chain-extended or cured products by curing by U.V radiation followed by heat curing.

It has now been found that extremely rapid adduct forming, chain-extending or curing reactions can be obtained by heating a composition comprising an ethylenically unsaturated compound, e. g., monomer and/or prepolymer in combination with a polythiol and a catalytic amount of a substituted or unsubstituted pinacol of the general formula:

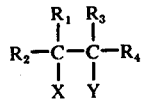

wherein $R_1$ and $R_3$ are the same or different substituted or unsubstituted aromatic radicals, $R_2$ and $R_4$ are substituted or unsubstituted aliphatic or aromatic radicals and X and Y which may be the same or different are hydroxyl, alkoxy or aryloxy.

In practicing the instant invention practically any ethylenically unsaturated compound which contains one or more double bonds in the molecule is operable herein. Examples of ethylenically unsaturated compounds include but are certainly not limited to acrylic esters, methacrylic esters, styrene, vinyl-toluene, acrylonitrile, methacrylonitrile, vinyl chloride, vinylidene chloride, butadiene, isoprene, chloroprine, divinyl-benzene, di(vinyl-phenyl) carbonate, diallyl phthalate, diallyl carbonate, di-(allylphenyl) carbonate, diallyl furmarate, unsaturated polyesters, triallyl- isocyanaurate, triallyl-cyanurate, diallylchlorendate, diallyl-maleate and mixtures thereof. Additionally, ethylenically unsaturated compounds such as the polyenes disclosed in U.S. Pat. No. 3,662,023 incorporated herein by reference are operable in the instant invention.

By the term unsaturated polyesters herein is meant the usual polycondensation products which consist of ester-like linked residues of polyvalent, especially divalent, alcohols, as well as possibly also residues of monovalent alcohols and/or of monovalent carboxylic acids, whereby the residues must contain at least partially unsaturated groups. Examples of acids include maleic acid, fumatic acid, itaconic acid, mesaconic acid, citraconic acid, succinic acid, glutaric acid, adipic acid, phthalic acid, tetrachlorophthalic acid, hexachloroendomethylenetetrahydrophthalic acid, trimellitic acid, benzoic acid, linseed oil fatty acid and ricinoleic fatty acid and mixtures thereof. Examples of alcohols include ethylene glycol, diethylene glycol, propane- butane and hexane diols, trimethylolpropane, pentaerthritol, butanol and tetrahydrofurfuryl alcohol.

Although the unsaturated polyesters per se in combination with polythiols and a benzopinacol compound are operable herein to form useful products, they may also be used in combination with conventional copolymerizable monomeric compounds. Examples of conventional copolymerizable monomeric compounds are unsaturated compounds with vinyl groups which may be substituted in the $\alpha$-postion or allyl groups which may be substituted in the $\beta$-position, such as styrene, vinyl-toluene, divinyl-benzene, vinyl acetate, acrylic acid and its esters, acrylonitrile, methacrylic acid and its corresponding derivatives, as well as allyl esters, such as allyl acetate, allyl acrylate, phthalic acid diallyl ester, triallyl phosphate and triallyl cyanurate.

Polythiols operable herein are simple or complex organic compounds having a multiplicity of pendant or terminally positioned —SH functional groups per average molecule.

The polythiol must contain 2 or more —SH groups/molecule and have a viscosity range of essentially 0 to 20 million centipoises (cps.) at 70° C as measured by a Brookfield Viscometer either alone or when in the presence of an inert solvent, aqueous dispersion or plasticizer. Operable polythiols in the instant invention usually have molecular weights in the range about 94 to about 20,000 and preferably from about 100 to about 10,000.

The polythiols operable in the instant invention may be exemplified by the general formula $R_8$—$(SH)_n$ where $n$ is at least 2 and $R_8$ is a polyvalent organic moiety free from reactive carbon-to-carbon unsaturation. Thus $R_8$ may contain cyclic groupings and hetero atoms such as N, P or O and primarily contains carbon-carbon, carbon-hydrogen, carbon-oxygen, or silicon-oxygen containing chain linkages free of any reactive carbon-to-carbon unsaturation.

One class of polythiols operable herein are esters of thiol-containing acids of the formula $HS—R_9—COOH$ where $R_9$ is an organic moiety containing no reactive carbon-to-carbon unsaturation with polyhydroxy compounds of structure $R_{10}—(OH)_n$ where $R_{10}$ is an organic moiety containing no reactive carbon-to-carbon unsaturation, and $n$ is 2 or greater. These components will react under suitable conditions to give a polythiol having the general structure:

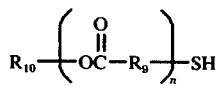

where $R_9$ and $R_{10}$ are organic moieties containing no reactive carbon-to-carbon unsaturation, and $n$ is 2 or greater.

Polythiols such as the aliphatic monomeric polythiols (ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, are operable herein. Examples of the polythiol compounds preferred include but are not limited to esters of thioglycolic acid ($HS—CH_2COOH$), α-mercaptopropionic acid ($HS—CH(CH_3)—COOH$ and β-mercaptopropionic acid ($HS—CH_2CH_2COOH$) with polyhydroxy compounds such as glycols, triols, tetraols, pentaols, hexaols, and the like. Specific examples of the preferred polythiols include but are not limited to ethylene glycol bis (thioglycolate), ethylene glycol is (β-mercaptopropionate), trimethylolopropane tris (thioglycolate), trimethylolpropane tris(β-mercaptopropionate), pentaerythritol tetrakis (thioglycolate) and pentaerythritol tetrakis (β-mercaptopropionate), all of which are commercially available. A specific example of a preferred polymeric polythiol is polyproplylene ether glycol bis (β-mercaptopropionate) which is prepared from polypropylene-ether glycol (e. g. Pluracol P2010, Wyandotte Chemical Corp.) and β-mercaptopropionic acid by esterification.

Additionally, polythiol terminated polyoxyalkylene polyols, such as trimethylolpropane tris-(3-mercapto-2hydroxypropyl-monooxypropyl) ether and trimethylolpropane tis-(3-mercapto-2-hydroxypropyl-dioxypropyl) ether. are operable. Furthermore, saturated alicyclic dithiols, such as 1,5-cyclooctanedithiol, 3,7,11-trimethyl-1,5-cyclododecanedithiol, 4-hexyl-1,2-cyclochexanedithiol, ethylcyclohexyl dithiol and d-limonene dithiol represent commercially available dithiols that are operable herein.

The mole ratio of the carbon-to-carbon double bonds in the ethylenically unsaturated compound to the thiol groups in the polythiol can be varied between wide limits depending upon whether an adduct, chain-extended or cured product is desired.

For example, to obtain an adduct by reacting a polythiol, e. g. pentaerythritol tetrakis (β-mercaptopropionate) with a mono-ethylenically unsaturated compound, e. g., acrylonitrile, vinyl acetate, the mole ratio of the carbon-to-carbon double bonds in the mono-ethylenically unsaturated compound to the thiol groups in the polythiol is 1:4, respectively.

To obtain a chain-extended product, each reactant, i. e. the ethylenically unsaturated compound and the polythiol, must each contain two functional groups thereby requiring a 1:1 mole ratio.

For a crosslinked product, at least one of the ethylenically unsaturated compounds and the polythiol each must contain at least two functional groups and the total functionality must be greater than four.

Thus, the mole ratio of the carbon-to-carbon double bonds in the ethlenically unsaturated compound to the thiol groups in the polythiol is in the range 1:10 to 10:1, preferably 1:5 to 5:1, respectively.

The substituted or unsubstituted pinacols operable herein as a catalyst have the general formula:

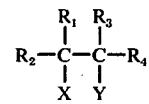

wherein $R_1$ and $R_3$ are the same or different substituted or unsubstituted aromatic radicals, $R_2$ and $R_4$ are substituted or unsubstituted aliphatic or aromatic radicals and X and Y which may be the same or different are hydroxyl, alkoxy or aryloxy.

Preferred pinacols are those wherein $R_1$, $R_2$, $R_3$, and $R_4$ are aromatic radicals, especially phenyl radical and X and Y are hydroxyl.

Examples of this class of compounds include but are not limited to benzopinacol, 4,4'-dichlorobenzopinacol, 4,4'-dibromobenzopinacol, 4,4'-diiodobenzopinacol, 4,4',4'',4'''-tetrachlorobenzopinacol, 2,4-2',4'-tetrachlorobenzopinacol, 4,4'-dimethylbenzopinacol, 3,3'-dimethylbenzopinacol, 2,2'-dimethylbenzopinacol, 3,4-3',4'-tetramethylbenzopinacol, 4,4'-dimethoxybenzopinacol, 4,4', 4'',4'''-tetramethoxybenzopinacol, 4,4'-diphenylbenzopinacol, 4,4'-dichloro-4'',4'''-dimethylbenzopinacol, 4,4'-dimethyl-4'',4'''-diphenylbenzopinacol, xanthonpinacol, fluorenonepinacol, acetophenonepinacol, 4,4'-dimethylacetophenone-pinacol, 4,4'-dichloro-acetophenonepinacol, 1,1,2-triphenyl-propane-1,2-diol, 1,2,3,4-tetraphenylbutane-2,3-diol, 1,2-diphenylcyclobutane-1,2-diol, propiophenone-pinacol, 4,4'-dimethylpropiophenone-pinacol, 2,2'-ethyl-3,3'-dimethoxypropiophenone-pinacol, 1,1,1,4,4,4-hexafluoro-2,3-diphenyl-butane-2,3-diol.

As further compounds according to the present invention, there may be mentioned: benzopinacol-mono methylether, benzopinacol-mono-phenylether, benzopinacol and monoisopropyl ether, benzopinacol monoisobutyl ether, benzopinacol mono (diethoxy methyl) ether and the like.

The pinacol is added to the composition in amounts ranging from 0.01 – 5% preferably 0.1 – 3% by weight based on the weight of the ethylenically unsaturated compound and the polythiol.

The compositions of the present invention may, if desired, include such additives an antioxidants, accelerators, dyes, inhibtitors, activators fillers, pigments, antistatic agents, flame-retardant agents, thickeners, thixotropic agents, surface-active agents, viscosity modifiers, extending oils, plasticizers, tackifiers and the like within the scope of this invention. Such additives are usually preblended with the ethylenically unsaturated compound or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts of ethylenically unsaturated compound and polythiol by weight and preferably about 0.005 to about 300 parts on the same basis.

In practicing the instant invention aducts, chainextended or cured products can also be obtained from the composition comprising an ethylenically unsaturated compound, polythiol and pinacol catalysts by subjecting said composition to heat followed by U.V. radiation. In this instance, no additional photosensitizer need to added to the composition to aid the U.V. radiated reaction. In the instance where the composition is subjected to U.V. radiation followed by heat activation, it is necessary to add known photosensitizers in order to initiate the U.V. reactions. Thus, when U.V. radiation is used followed by heating, a photosensitizer is added to the composition. Preferred photosensitizers are the aldehyde and ketone carbonyl compounds having at least one aromatic nucleus attached directely to the

group. Various photosensitizers include, but are not limited to, benzophenone, acetophenone, o-methoxybenzophenone, acenapthene-quinone, methyl ethyl ketone, valerophenone, hexanophenone, α-phenylbutyrophenone, p-morpholinopropionphenone, dibenzosuberone, 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthrene-9-one, 7-H-benz[de]anthracen-7-one, 1-naphthaldehyde, 4,4'-bis(dimethylamino) benzophenone, fluorene-9-one, 1'-acetonaphthone, 2'-acetonaphthone, 2,3-butanedione, triphenylphosphine, trio-o-tolyphosphine, acetonaphthone, 2,3-butanedione, benz[a]anthracene 7.12 dione, etc. Another class of photosensitizers is the benzoin ethers, such as benzoin methyl ether, benzoin ethyl ether, benzoin isopropyl ether and benzoin isobutyl ether. The photosensitizers are usually added in an amount ranging from 0.0005 to 30% by weight of the ethylenically unsaturated compound and the polythiol.

When U.V. radiation is used, an intensity of 0.0004 to 60.0 watts/cm$^2$ in the 250–400 nanometer region is usually employed.

To initiate the reaction herein, it is necessary to heat the reactants to at least 50° C, preferably in the range 80°–250° C in order to form the adduct, chainextended or cured product.

The following examples will aid to explain but specifically not limit the instant invention. Unless otherwise noted, all parts and percentages are by weight.

EXAMPLE 1

1 gram-mole of a commercially available 80–20 percent isomer mixture of tolylene-2,4-diisocyanate and tolylene-2,6-diisocyanate, respectively, was charged to a resin kettle equipped with a condenser, stirrer, thermometer, and gas inlet and outlet. 2 gram-moles of the diallyl ether of trimethylolpropane was slowly added to the kettle. After the addition was complete, 0.5 grams of dibutyl tin dilaurate as a catalyst was added to the kettle and the reaction was continued for 30 minutes at 70° C under nitrogen. The thus formed allyl terminated liquid prepolymer of the formula

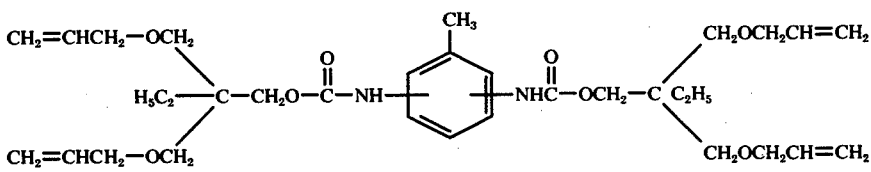

will hereinafter be referred to as Prepolymer A.

EXAMPLE 2

3,000 grams of commercially available polyoxyethylene glycol having a weight average molecular weight of 1,000 was outgassed by stirring at 110° C for about 3–5 hours. The remaining glycol having a weight of about 2,940 grams was cooled to 50° C and then added as a liquid over a period of 15–20 minutes under an inert nitrogen atmosphere to a 5 liter three neck flask equipped with inlet, thermometer and stirrer containing 978 grams of a a commercially available 80–20% isomer mixture of toluene-2, 4-diisocyanate and toluene-2,6-diisocyanate respectively. The reaction temperature was maintained between about 50 and 60° C with stirring for 3 hours. A portion of the isocyanate capped polyoxyethylene glycol product was removed from the flask leaving 3,120 grams of product therein. The flask was heated in the range 40°–50° C and 1.82 gram of stannous octoate was added thereto with stirring. 520 grams of hydroxypropyl acrylate were added dropwise to the flask and the reaction was continued for 28 hours with stirring. The thus formed prepolymer had a viscosity of 82,000 centipoises at 25° C and will be referred to hereinafter as Prepolymer B.

EXAMPLE 3

To a four liter resin kettle equipped with stirrer, thermometer, inlet and outlet, and condenser was charged 661.9 grams of a commercially available 80–20% isomer mixture of toluene-2,4-diisocyanate and toluene-2,6-diisocyanate respectively, along with 0.87 gram of stannous octoate. 494.1 grams of commercially available hydroxypropylacrylate was added dropwise to the kettle over a 1 hour and 10 minute period using a water bath to maintain the temperature between 60°–65° C. The reaction was then continued for 1~ hours at a temperature between 60 and 70° C, at which time the isocyanate content analyzed 3.22 meq/- gram. 0.32 additional gram of stannous octoate were added to the kettle along with 2,053 grams of a commercially available polypropylene glycol having a molecular weight of 1,000. The reaction was continued for 5 hours at 60°-70° C at which time the isocyanate content was 0.01 meq per gram. The thus formed product had a viscosity of 220,000 centipoises at 25° C and will hereinafter be referred to as Prepolymer C.

EXAMPLE 4

253 g of commercially available trimethylol propane diallyl ether (4.54 meq. OH/g) was added dropwise to a 3-necked flask containing 200 g of toluene diisocyanate (an 80/20 mixture of the 2,4 and 2,6 isomers) (11.48 meq. NCO/g.). The reaction was continued with stirring at 60° C for 8 hours. To the reaction product was added 118 g of commercially available di(2-hydroxyethyl)dimethylhydantoin (8.92 meq. OH/g) of the formula:

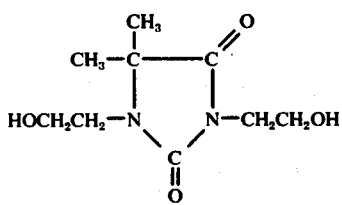

along with 0.25 g of stannous octoate as a catalyst. Some heat was required to start the reaction and due to the mixture becoming extremely viscous as the reaction proceeds, the temperature had to be raised to 95° C to insure proper mixing. The reaction was maintained at this temperature until complete as shown by the disappearance of the NCO band by IR. The resulting product of the formula:

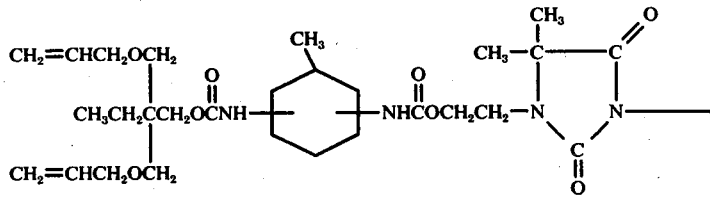
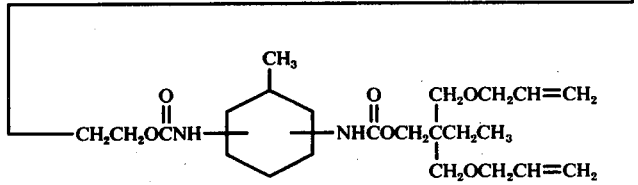

had a glass melting point of 95° C, unsaturation: theory, 4.03 m moles/g; found, 4.06 m moles/g. This polyene prepolymer will hereinafter be referred to as Prepolymer D.

EXAMPLE 5

To a 2,000 ml 3-necked flask equipped for distillation with stirrer was charged 432 grams (2 moles) of commercially available N,N'-bis(2-hydroxyethyl) dimethylhydantoin 445 grams of mercaptopropionic acid and 17.5 grams p-toluenesulfonic acid. 100 ml of ethylene dichloride was added to the flask. The mixture was heated with stirring for 8 hours and the evolved water was continuously removed by azeotropic distillation at 71°-75° C, returning the ethylene dichloride to the reaction flask. The solution in the flask was then washed once with about 1,000 ml water, twice with about 1,000 ml of 5 percent sodium bicarbonate and finally with about 1,000 ml of water. The solution was dried over anhydrous magnesium sulfate, mixed with 10 g of decolorizing carbon and filtered. The solvent was removed by vacuum distillation, affording 672 g of product or an 86 percent yield of the following polythiol:

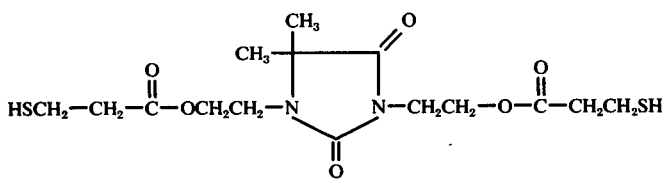

This polythiol will be referred to hereinafter as Polythiol A.

Preparation of 4, 4', 4", 4'''-tetramethoxybenzopinacol

EXAMPLE 6

To a one neck, one liter round bottom glass flask equipped with condenser was charged 50 g of 4,4'-dimethoxybenzophenone along with 900 cc of isopropanol and 1 drop of glacial acetic acid. A 275 watt U.V. sunlamp was placed four inches from the flask and the contents of the flask were irradiated for 50 hours. The crystals were filtered from the solution, washed with high boiling petroleum ether, then recrystallyzed from high boiling petroleum ether. NMR analysis showed 11.7 mole percent of 4, 4', 4", 4'''-tetramethoxybenzopinacol product in 4, 4' dimethoxy-benzophenone.

Preparation of 4, 4', 4'', 4'''-tetrachlorobenzopinacol

EXAMPLE 7

To a one neck, one liter round bottom glass flask equipped with condenser was charged 25 g of 4, 4'-dichlorobenzophenone, 450 cc isopropanol and 1 drop of glacial acetic acid. The mixture was heated to dissolve the ketone and then the resulting solution was exposed to radiation through the flask wall for 120 hours from a 275 watt U.V. sunlamp situated four inches from the side of the flask. The solution was then vacuum-stripped of solvent and the resulting solid material recrystallized from n-heptane. After filtration and drying the product had a melting point of 170°–174° C.

Preparation of 4,4'-dichlorobenzopinacol

EXAMPLE 8

To a one neck, one liter round bottom glass flask equipped with condenser was charged 50 g of 4-chlorobenzophenone, 700 cc of butanol and one drop of glacial acetic acid. A 275 watt U.V. sunlamp was placed 4 inches from the side of the flask and the solution was irradiated for 50 hours. Crystals began to precipitate from the solution after 29 hours. The precipitated crystals were filtered from the solution, washed with high boiling petroleum ether, and recrystallized from ethanol to give a product with a melting point of 164°–167° C. NMR and infrared showed essentially a pure 4,4'-dichlorobenzopinacol product.

Preparation of 4,4'-dimethoxybenzopinacol

EXAMPLE 9

To a one neck, one liter round bottom glass flask equipped with a stirrer and condenser was charged 10 g of 4-methoxybenzophenone, 300 cc of isopropanol, and 1 drop of glacial acetic acid. The solution was exposed to radiation through the flask wall for 140 hours from a 275 watt U.V. sunlamp situated 4 inches from the side of the flask. The solvent was stripped off under vacuum and the residue crystallized from ethyl alcohol to give 4,4'-dimethoxybenzopinacol with, after drying, a melting point of 163°–165° C.

EXAMPLE 10

A formulation was prepared as follows.

2,000 g of Prepolymer A prepared as in Example 1 were admixed with 6 g of octadecyl-$\beta$-(4-hydroxy-3,5-di-t-butyl phenyl) propionate commercially available from Geigy-Ciba under the tradename "IRGANOX 1076", 15 g of 2,6-di-tert-butyl-4-methyl phenol, commercially available under the tradename "Ionol" from Shell Chemical Co., 0.52 g of phosphorous acid, and 46.3 g of mercaptopropionic acid. The mixture was heated at 50° C until all the components had dissolved. The resulting solution was blended with 1611 g of pentaerythritol tetrakis($\beta$) -mercaptopropionate), commercially available from Evans Chemetics.

The resultant formulation will be referred to hereinafter as Formulation A.

EXAMPLE 11

A formulation was made up as follows: 2,616 g of commercially available diallyl chlorendate was admixed with 0.8 g of phosphorous acid and 0.4 g of pyrogallol. The mixture was heated at 50° C until all the components had dissolved. The resulting solution was blended with 1,384 g of pentaerythritol tetrakis ($\beta$-mercaptopropionate), commercially from Evans Chemetics.

The resulting formulation will hereinafter be referred to as Formulation B.

EXAMPLE 12

A formulation was made up as follows.

581.2 g of Prepolymer D from Example 4 was admixed with 0.43 g of phosphorous acid, 1.72 g of "IRGANOX 1076" and 0.86 g of "Ionol". The mixture was heated at 50° C until all the components had dissolved. The resulting solution was blended with 73.4 g of pentaerythritol tetrakis ($\beta$-mercaptopropionate) and 206.1 g of ethylene glycol bis ($\beta$-mercaptpropionate) both commercially available from Evans Chemetics. The thus formed formulation will hereinafter be referred to as Formulation C.

EXAMPLE 13

A formulation was made up as follows. 791 g of Prepolymer D prepared as in Example 4 was admixed with 0.59 g of phosphorous acid, 2.38 go "IRGANOX 1076" and 1.19 g of "Ionol". The mixture was heated at 50° C until all the components had dissolved. The resulting solution was blended with 403 g of ethylene glycol bis ($\beta$-mercaptopropionate), commercially available from Evans Chemetics. The thus formed formulation will hereinafter be referred to as Formulation D.

EXAMPLE 14

A formulation was made up as follows. 492 g of Prepolymer A prepared as in Example 1 was admixed with 0.227 g of phosphorous acid, 0.227 g of hydroquinone and 0.568 g of pyrogallol. The mixture was heated at 50° C until all the components had dissolved. The resulting solution was blended with 640.5 g of Polythiol A from Example 5. The thus formed formulation will hereinafter be referred to as Formulation E.

EXAMPLE 15

A formulation was made up as follows. 2404.4 g of commercially available triallyl cyanurate was admixed with 1.6 g of phosphorous acid, 4 g of hydroquinone and 4 g of pyrogallol. The mixture was heated at 50° C until all the components had dissolved. The resulting solution was blended with 5595.6 g of Polythiol A from Example 5. The thus formed formulation will hereinafter be referred to as Formulation F.

Example 16

A formulation was made up as follows. 1,620 g of commercially available triallyl cyanurate was admixed with 0.8 go phosphorous acid, 0.2 g of hydroquinone and 0.2 g pyrogallol. The mixture was heated at 50° C until all the components had dissolved. The resulting solution was blended with 2,380 g of pentaerythritol tetrakis ($\beta$-mercaptpropionate). The thus formed formulation will hereinafter be referred to as Formulation G.

EXAMPLE 17

A formulation was prepared as follows. 2,000 g of Prepolymer A prepared as in Example 1 were admixed with 6 g of octadecyl-$\beta$-(4-hydroxy-3,5-di-t-butyl phenyl) propionate commercially available from Geigy-Ciba under the tradename "IRGANOX 1076", 15 g of 2,6-di-tert-butyl-4-methyl phenol, commercially available under the tradename "Ionol" from Shell Chemical Co., 0.52 g of phosphorous acid and 46.3 g of mercaptopropionic acid. The mixture was heated at 50° C until all the components had dissolved. The resulting solution was blended with 1,611 g of pentaerythritol tetrakis ($\beta$-mercaptopropionate), commercially available from Evans Chemetics and 30 g of benzophenone.

The resultant formulation will be referred to hereinafter as Formulation H.

EXAMPLE 18

50 g triallyl cyanurate, commercially available from American Cyanamid Co., was admixed with 1.225 g of benzopinacol, 0.025 g of phosphorous acid, 0.006 g of hydroquinone and 0.006 g pyrogallol. The mixture was heated at 50° C until all of the components had dissolved. The resulting solution was blended with 72.5 g of pentaerythritol tetrakis ($\beta$-mercaptopropionate) commercially available from Evans Chemetics. 25 g of this formulation was placed in a 50 ml beaker and heated on a hot plate to 80°–90° C. After about 30 seconds at 80°–90° C the solution exothermed rapidly to 180° C and cured to a colorless, odorless, tack-free solid in less than 1 minute.

EXAMPLE 19

20 g of Formulation A from Example 10 were admixed with 0.2 g of 4,4' dichlorobenzopinacol from Example 8 in a 50 ml beaker and heated on a hot plate to 87°–92° C. At this temperature the reaction exothermed to 170° C and the material cured to a yellow, odorless, tack-free solid.

EXAMPLE 20

20 g of Formulation A from Example 10 were admixed with 0.9 g of 11.7 mole percent of 4,4',4'',4'''-tetramethoxybenzopinacol in 4,4'-dimethoxybenzophenone from Example 6 in a 50 ml beaker. The admixture was heated with stirring to 108° C whereat the reaction exothermed to greater than 150° C resulting in a cured, colorless, odorless, tack-free solid.

A control of this example was run employing 20 g of Formulation A from Example 10 admixed with 0.8 g of 4,4'-dimethoxybenzophenone. No change was noted when this sample was heated with stirring to 130° C which shows that the 4,4',4'',4'''-tetramethoxybenzopinacol is responsible for the curing.

EXAMPLE 21

20 g of Formulation A from Example 10 were admixed with 0.2 g of 4,4',4'',4'''-tetrachlorobenzopinacol from Example 7 in a 50 ml beaker. The contents of the beaker were slowly heated with stirring, the crystals dissolving at about 60° C. Heating was continued to 100°–105° C whereat the reaction exothermed to 140° C resulting in a cured, elastomeric product.

EXAMPLE 22

20 g of Formulation A from Example 10 was admixed with 0.1 g of commercially available benzopinacol in a 50 ml beaker. The sample was slowly heated with stirring to about 90° C whereat the reaction exothermed to 180° C in less than a minute and cured to a colorless, odorless, tack-free solid.

EXAMPLE 23

0.19 g of commercially available benzopinacol was dissolved in 10 g of commercially available trimethylolpropane triacrylate to which were then added 9.1 g of pentaerythritol tetrakis($\beta$-mercaptopropionate). The mixture was slowly heated to about 75° C whereat the reaction quickly exothermed to 190°–200° C resulting in a cured, hard, colorless, tack-free solid.

EXAMPLE 24

0.2 g of commercially available benzopinacol was dissolved in 10 g of commercially available trimethylolpropane triacrylate to which were then added 9.8 g of commercially available trimethylolpropane tris(mercaptopropionate), a polythiol commercially available from Evans Chemetics. The admixture was heated to about 70° C whereat the reaction quickly exothermed to 190°–200° C resulting in a cured, slightly yellow, tack-free solid.

EXAMPLE 25

0.17 g of commercially available benzopinacol was dissolved in 4.4 g of commercially available trimethylolpropane triacrylate. To this solution was added 5 g of Prepolymer A prepared as in Example 1 along with 8 g of commercially available pentaerythritol tetrakis($\beta$-mercaptopropionate). The mixture was heated with stirring slowly to 90° C whereat the reaction exothermed to 190° C in less than a minute resulting in a cured, hard, solid, yellow product.

EXAMPLE 26

0.25 g of commercially available benzopinacol were dissolved in 4.0 g of commercially available trimethylolpropane triacrylate. To the solution was added 14.2 g of a commercially available general purpose polyester resin containing 2.02 mmoles C=C/g and 7.2 g of commercially available pentaerythritol tetrakis($\beta$-mercaptopropionate). The mixture was slowly heated to 100° C with stirring whereat after 3 minutes a cured, hard, tack-free solid product resulted.

EXAMPLE 27

0.19 g of benzopinacol was dissolved in 2 g of commercially available triallyl cyanurate to which was then added 11.3 g of a commercially available general purpose polyester resin containing 2.02 mmoles C=C/g and 5.8 g of pentaerythritol tetrakis($\beta$-mercaptopropionate). The materials were slowly heated to 100° C with stirring and maintained thereat. After 15 minutes a cured, hard, solid product resulted.

EXAMPLE 28

0.18 g of benzopinacol was dissolved in 2.4 g of commercially available trimethylolpropane triacrylate. To the solution was added 8.4 g of a general purpose polyester resin containing 2.02 mmoles C=C/g and 6.5 g of pentaerythritol tetrakis($\beta$-mercaptopropionate). The mixture was heated slowly to 100° C with stirring. After 15 minutes at 100° C a cured, hard, solid product resulted.

EXAMPLE 29

0.31 g of benzopinacol was dissolved in 25 g of a general purpose polyester resin containing 2.02 mmoles C=C/g with stirring at 100° C in an oven after one hour. 6.4 g of pentaerythritol tetrakis($\beta$-mercaptopropionate) was added to the solution and the solution was heated to 125° C over a 45 minute period, at which time a cured, hard, solid product resulted.

The example was repeated except that 3.2 g of pentaerythritol tetrakis(β-mercaptopropionate) was substituted for the 6.4 g used previously. Under the same heating conditions a cured, hard, solid product resulted.

The following examples in Table I show the amount of polythiol necessary to react with an allylic polyene in the presence of benzopinacol in order to form a cured product.

TABLE II

| Cure | Modulus (psi) | Tensile (psi) |
|---|---|---|
| 1 min. Addalux | 5,490 | 1,220 |
| 180° C — 2 min. | 15,600 | 1,500 |
| 180° C — 3 min. | 31,150 | 2,300 |
| 180° C — 4 min. | 34,900 | 2,100 |

EXAMPLE 51

100 g of Formulation A from Example 10 was ad-

TABLE I

| Ex. No. | Polyene Type | Pentaerythritol Tetrakis (β-mercaptopropionate) g | Benzopinacol gms. | Heating Conditions ° C | Resulting Product |
|---|---|---|---|---|---|
| 30 | Prepolymer A from Ex. 1 | 30 | 1.5 | 0.3 | 120° for 5 min. | Mixture thickened and some gellation, no exotherm |
| 31 | Prepolymer A from Ex. 1 | 30 | 3.0 | 0.3 | 120° for 5 min. | Mixture thickened and some gellation, no exotherm |
| 32 | Prepolymer A from Ex. 1 | 30 | 3.0 | 0.6 | 160° for 1 min. | Mixture thickened and some gellation, no exotherm |
| 33 | Prepolymer A from Ex. 1 | 30 | 6.0 | 0.36 | 120° for 1 min. | Exothermed to 140° C and cured |
| 34 | Prepolymer A from Ex. 1 | 30 | 6.0 | 0 | 120° for 5 min. | No change |
| 35 | Triallyl Cyanurate | 20 | 1.0 | 0.21 | 130°–160° for 10 min. | No change |
| 36 | Triallyl Cyanurate | 20 | 2.0 | 0.22 | 130°–160° for 10 min. | No change |
| 37 | Triallyl Cyanurate | 20 | 4.0 | 0.24 | 130°–160° for 3 min. | Tacky cure after 3 minutes |
| 38 | Triallyl Cyanurate | 20 | 5.0 | 0.25 | 120° for <1 min. | Exothermed to 180° C and cured |
| 39 | Triallyl Cyanurate | 18 | 5.4 | 0.23 | 110°–120° for <1 min. | Exothermed to 180° C and cured |
| 40 | Triallyl Cyanurate | 18 | 6.4 | 0.24 | 110°–120° for <1 min. | Exothermed to 180° C and cured |
| 41 | Diallyl Phthalate | 15 | 1.5 | 0.16 | 130°–160° for 10 min. | Slight thickening |
| 42 | Diallyl Phthalate | 15 | 2.25 | 0.17 | 130°–160° for 10 min. | Slight thickening |
| 43 | Diallyl Phthalate | 15 | 3.0 | 0.18 | 120° for <1 min. | Exothermed to 180° C — thickened |
| 44 | Diallyl Phthalate | 15 | 3.7 | 0.19 | 110° for <1 min. | Exothermed to 200° C — thickened |
| 45 | Diallyl Phthalate | 15 | 4.5 | 0.20 | 110°–120° for <1 min. | Exothermed to 200° C — very thickened |
| 46 | Diallyl Phthalate | 15 | 5.25 | 0.21 | 110°–120° for <1 min. | Exothermed to 200° C — very thickened |
| 47 | Diallyl Phthalate | 10 | 4.0 | 0.14 | 110°–120° for <1 min. | Exothermed to 180° C — gel and tacky |
| 48 | Diallyl Phthalate | 10 | 5.0 | 0.15 | 110°–120° for 1 min. | Exothermed to 190° C — cured tackfree |
| 49 | Diallyl Phthalate | 10 | 6.0 | 0.16 | 110°–120° for <1 min. | Exothermed to 190° C — cured tackfree |

EXAMPLE 50

A formulation was made up consisting of 150 g of Formulation H from Example 17 and 1.5 g of commercially available benzopinacol. The benzopinacol was dissolved in Formulation H by heating at 50° C and stirring. The thus dissolved solution was poured into separate molds having a thickness of 20 mils and, thereafter, subjected to curing by heating at various times at 180° C in a forced air oven or by exposure for 1 minute to U.V. radiation from an Ascor Addalux Printing Lamp Photopolymer Type 3650 Ang., SKW, Berky Photo, Inc., situated 2 ft from the surface of the curable composition. The properties of the cured products in Table II show that improved properties can be obtained by thermal compared to U.V. curing.

mixed with 1 g of commercially available benzopinacol and heated at 50° C until the benzopinacol dissolved. The thus formed solution was coated on black plate aluminum sheet metal to a thickness in the range 10–15 mils. The thus coated sheet metal was placed one half inch from a Sylvania infrared lamp covered with aluminum foil having a five pointed star cut out of the aluminum at its center. The polymer solution on the metal was exposed for 20 seconds to infrared. The plate was washed with ethyl alcohol to remove the unexposed, uncured polymer leaving a cured polymer image of a five pointed star on the sheet metal.

EXAMPLE 52

1 g of commercially available benzopinacol was dissolved in 100 g of Formulation A from Example 10 at 50° C. 20 g of commercially available titanium dioxide pigment sold under the Tradename "Unitone OR-600" was admixed into the solution and the resultant mixture was coated onto steel plate, aluminum sheeting and glass at thicknesses of from 1-5 mils and ⅜ inches. The thus coated materials were then transferred to a hot plate maintained at 90°-100° C. Within a few seconds the coatings having thicknesses of 1-5 mils cured to a hard solid and in less than a minute the coatings having a thickness of ⅜ inches cured to a hard solid.

EXAMPLE 53

2 g of benzophenone and 0.2 g of benzopinacol were melted together at about 50° C and, thereafter, added to 100 g of Formulation A from Example 10. 30 g of the mixture was poured into each of three 50 ml beakers with 10 g of zinc oxide being added to one beaker, 10 g of titanium dioxide being added to another beaker and 10 g of barium sulphate being added to the third beaker. The beakers were then slowly heated to 90° C with stirring. After about 1-2 minutes at 90° C, the samples cured to a hard solid.

The stability of the instant compositions against pre-curing is shown in the following example:

EXAMPLE 54

The following formulations were made up by admixing the formulation with or without benzopinacol and heating the mixture to 50° C to melt the materials. For comparison, a conventional chemical free-radical generator, i.e., 2.0 g of 75% 1,1-di-t-butylperoxy 3,3,5-trimethyl cyclohexane in dibutyl phthalate was also tested for stability.

| Formulation | Components | Grams |
|---|---|---|
| 54-1 | Formulation H from Example 17 | 200 |
| 54-2 | Formulation H from Example 17 | 200 |
|  | Benzopinacol | 0.2 |
| 54-3 | Formulation B from Example 11 | 200 |
| 54-4 | Formulation B from Example 11 | 200 |
|  | Benzopinacol | 0.2 |
| 54-5 | Formulation C from Example 12 | 200 |
| 54-6 | Formulation C from Example 12 | 200 |
|  | Benzopinacol | 0.2 |
| 54-7 | Formulation H from Example 17 | 200 |
|  | 75% 1,1-di-t-butylperoxy 3,3,5-trimethyl cyclohexane in dibutyl phthalate | 2 |

Each formulation was placed in a beaker, maintained at room temperature. The viscosities of the formulations were measured over a 24 day period on a Brookfield Synchro-Lectric viscometer and the results in cps. are given in Table III. The results show a vastly greater storage stability of the benzopinacol containing system over a conventional peroxide system.

thermed rapidly and cured to a hard solid having a thickness of 80 mils.

The following example shows the necessity of using a polythiol as compared to a monothiol in order to obtain a cured product from allylic type ethylenically unsaturated compounds.

EXAMPLE 56

1 g of commercially available benzopinacol was dissolved in 50 g of commercially available triallyl cyanurate (11.48 m moles C=C/gram), 51.7 g of methyl mercaptopropionate (11.11 meq SH/g), 2.04 g of benzophenone and 0.02 g of phosphorous acid were added to the solution. The mixture was heated slowly with stirring to a 130° C, whereat the mixture fumed but no gellation or curing occurred.

1 g of commercially available benzopinacol was dissolved in 50 g of commercially available triallyl cyanurate (11.48 m moles C=C/g). 40.1 g of octadecyl mercaptopropionate (2.86 meq SH/g), 0.1 g benzophenone and 0.01 g phosphorous acid were added to the solution. The mixture was heated to 130° C slowly with stirring. Fuming was noted but no curing occurred.

EXAMPLE 57

An admixture was made up consisting of 1.56 g of benzopinacol, 55.9 g of pentaerythritol tetrakis(β-mercaptopropionate) and 100 g of a general purpose polyester resin containing 30% by weight styrene monomer. The admixture was slowly heated to 130° C whereat it cured to a hard solid.

EXAMPLE 58

A formulation was made up consisting of 1.28 g of commercially available benzopinacol, 28 g of commercially available pentaerythritol tetrakis(β-mercaptopropionate) and 100 g of a general purpose polyester resin containing 30% by weight of styrene monomer. The admixture was slowly heated to 130° C. Thereat the mixture cured to a hard, solid product.

EXAMPLE 59

0.01 g of phosphorous acid and 0.27 g of benzopinacol were dissolved in 35.7 g of pentaerythritol tetrakis(β-mercaptopropionate). 20 g of commercially available acrylamide (14.08 m moles C=C/g) was melted at 86° C and thereafter mixed with the polythiol solution at a temperature of 86° C. The solution exothermed immediately to 230° C with color changing from clear to pale green to yellow. On cooling the resultant product was a very thick liquid.

TABLE III

| Example No. | After formulation at 24° C | 3 days later at 24° C | 5 days later at 24° C | 9 days later at 24° C | 12 days later at 24° C | 24 days later at 24° C |
|---|---|---|---|---|---|---|
| 54-1 | 1500 | 1500 | 1750 | 1600 | 1550 | 1500 |
| 54-2 | 1500 | 1575 | 1725 | 1575 | 1675 | 1500 |
| 54-3 | 675 | 600 | 650 | 600 | 650 | 550 |
| 54-4 | 675 | 600 | 650 | 600 | 650 | 550 |
| 54-5 | 74000 | 78250 | 83000 | 67500 | 76000 | 71500 |
| 54-6 | 72000 | 76000 | 81000 | 82000 | 76000 | 87000 |
| 54-7 | 2650 | 6950 | gelled | | | |

EXAMPLE 55

0.05 g of commercially available benzopinacol was melted and 100 g of Formulation A from Example 10 was added thereto. The material in a 50 ml beaker was heated slowly with stirring to 110° C whereat it exo-

EXAMPLE 60

30 g of commercially available diallyl phthalate were admixed with 32 g of pentaerythritol tetrakis(β-mercaptopropionate), 0.012 g of phosphorous acid and 0.62 g of benzopinacol. The admixture was slowly heated with stirring to 94° C whereat it exothermed rapidly to 180° C. A cured, yellow, solid product resulted.

EXAMPLE 61

0.34 g of benzopinacol were admixed with 23.9 g of pentaerythritol tetrakis(β-mercaptopropionate) and 10 g of commercially available acrylonitrile (18.9 C=C/g). The admixture was heated slowly with stirring to 100° C whereat it exothermed to 175° C. A viscous liquid product resulted.

EXAMPLE 62

4 g of commercially available triallyl cyanurate were admixed with 22.6 g of a commercially available general purpose polyester, 12.6 g of a commercially available general purpose polyester, 12.6 g of trimethylolpropanetris(β-mercaptopropionate) and 0.4 g of benzopinacol at 50° C. The admixture was heated to 100° C slowly with stirring. A cured, hard, solid product resulted after 5 minutes at 100° C.

EXAMPLE 63

5 g of commercially available benzopinacol were dissolved in 50 ml of methylene chloride. 8 g of the solution were admixed with 40 g of Formulation H from Example 17. The resultant mixture was placed in a vacuum oven to remove the methylene chloride. After partial removal of solvent the materials were heated slowly with stirring to a temperature of 87° C whereat the reaction exothermed to 170° C. A cured, solid foam resulted.

EXAMPLE 64

0.66 g of commercially available benzopinacol and 0.003 g of phosphorous acid were dissolved in 25 g of commercially available triallyl cyanurate (11.45 m moles C=C/g). 40.9 g of pentaerythritol tetrakis(β-mercaptopropionate) was blended in the solution and 20 g of the blend were charged to a 50 ml beaker. The sample was heated on a hot plate slowly to 90° C, then placed in an icewater bath with stirring. The sample cooled to 65° C and thereafter was removed from the icebath and allowed to cool to room temperature (24° C). The resulting sample was thickened compared to its initial state prior to heating. After 3 hours at 24° C the sample was reheated slowly with stirring to 90° C, then removed from the heat. The sample rapidly exothermed to 200° C curing to a hard, cured, solid material in 15 seconds.

Although it is known that polyene/polythiol combinations are curable in the presence of a photosensitizer by U.V. light, there are certain instances wherein U.V. light cannot be applied due to the opaqueness of the material through which the light must pass to reach the photocurable composition. The following examples will set forth instances wherein the use of benzopinacol and heat can effect curing which would not be possible in most instances with U.V. radiation.

EXAMPLE 65

The following formulation was made up. 0.06 g of phosphorous acid and 1.225 g of commercially available benzopinacol were melted in 50 g of commercially available triallyl cyanurate. 72.5 g of pentaerythritol-tetrakis (β-mercaptopropionate) were blended into the solution. The formulation was applied in the following end uses. 2 pieces of sheet steel one of which was coated with the formulation to a thickness of 3 mils were pressed together creating a lap joint and preheated to 120° C. After 5 seconds at 120° C the materials were removed from the hot plate and cooled to room temperature. The adherends could not be pried apart by hand strength.

A 3 mil thick coating of the formulation was put on an aluminum sheet which was then pressed in lap joint to another aluminum sheet and heated to 120° C for 5 seconds. After cooling to room temperature the sheets could not be pried apart by hand.

A 3 mil thick coating of the formulation was put on a steel sheet and glass was used as the other adherend in a lap joint. After pressing the steel and glass together slightly, the materials were put on a hot plate and heated to 120° C whereat they were held for 5 seconds. After cooling to room temperature the adherends could not be pulled apart by hand. The example was repeated using aluminum sheet instead of steel with the same results.

The example was repeated again using 2 glass adherends. The results were the same.

A treated paper, "KIMWIPE", was wetted with the curable composition and allowed to contact a hot plate at 180° C for less than a second. The paper was cured throughout with the curable composition.

The following examples show the ability to incorporate dyes, pigments and fillers into the system and still obtain a cured adhesive product.

EXAMPLE 66

50 g of Formulation G from Example 16 were admixed with 10 g of titanium dioxide and 0.5 g of benzopinacol. The blended material was coated at a thickness of 3-5 mils on steel, aluminum and glass and used as an adhesive between two glass adherends. All the various coated and adhered articles were placed on a hot plate, maintained at 180° C for about 10 seconds. In all cases a cured coating resulted. In the case of the adhesive, the glass adherends could not be pried apart by hand.

The example was repeated using Formulation A from Example 10 with the same result.

The example was repeated using Formulation G from Example 16 with 2.5 g of Cabot Sterling FT carbon black. The results were essentially the same.

EXAMPLE 67

50 g of Formulation G from Example 16 were admixed with 0.25 g of gentian violet and 0.5 g of benzopinacol. The admixture was coated on glass to a thickness of 3 mils and heated for about 10 seconds on a hot plate at 180° C. A cured, solid, hard, dyed coating resulted.

EXAMPLE 68

50 g of Formulation G from Example 16 were admixed with 0.5 g of commercially available benzopinacol and 12½ g of either aluminum, copper or iron powder. Portions of each of the three formulations were cured to a thickness of ⅜ inch after about 30 seconds on a hot plate at 180° C. The formulations were also applied as a thin coating (3-5 mils thick) on glass, aluminum and steel plate. After 10 seconds on a hot plate at 180° C, a cured, solid coating resulted in all instances.

EXAMPLE 69

Glass wool and cotton were separately wetted with Formulation G from Example 16 containing 1 weight percent benzopinacol. The thus wetted materials were each placed between two platens, one of which was heated, and were cured under slight pressure for 10 seconds at 100° C. A strong, free-standing, approximately 10 mil thick film resulted in each instance.

The example was repeated using woven fiberglass, which resulted in a free standing 10 mil thick film of the fiberglass embedded in the cured material.

EXAMPLE 70

100 g of Formulation G from Example 16 was admixed with 1 g of commercially available benzopinacol and heated at 50° C until the pinacol had dissolved. The resulting solution was then used to fill each cavity in a Coor's porcelain spot test plate. The plate was heated to 125° C and the polymer exothermed and cured to hard, colorless, tack-free, cup-shaped solids which were set aside for later use. The cavities were again filled with the same liquid polymer solution. A copper coin was placed on the top of the liquid polymer in one cavity, a dried fly was placed on another, and a dried flower on a third. The cup-shaped solids prepared above were then placed on the liquid polymers containing the solid objects and the Coor's porcelain plate was heated to 125° C to cure the liquid polymer. The result was a cured, solid, colorless, seamless lens with the various solid objects embedded in the middle showing the use of this process for encapsulation to prepare specimen samples, etc.

EXAMPLE 71

Example 70 was repeated except no solid objects were embedded in the polymer. The result was a clear, colorless, hard, solid, seamless lens which possessed magnifying properties.

EXAMPLE 72

100 g of Formulation F from Example 15 was admixed with 1 g of commercially available benzopinacol and 1 g of commercially available benzophenone and heated at 50° C until the additives had dissolved. The resulting solution was placed in a long vertical tube equipped with felt edged squeeges on top. Copper wire, 0.098" bare round, was inserted through the felt squeeges into the polymer solution and then slowly withdrawn. The wire coated in this way with 1 mil wall thickness of polymer was then placed 24 in. from an Ascor Addalux Printing Lamp, Photopolymer Type, 3650 Ang, SKW, Berky Photo, Inc. and irradiated for 1 minute while the wire was constantly rotated to expose all sides. The coating cured in this way by U.V. along was tacky and easily scratched from the wire. The coated and U.V. cured wire was then placed in a 180° C oven for 3 minutes to give a tack-free, tough coating which was not easily scratched from the wire.

EXAMPLE 73

20 g of Formulation G from Example 16 was admixed with 0.16 g of commercially available benzopinacol in a 50 ml beaker and heated at 50° C until the pinacol had dissclved. The resulting solution was placed in a Sears' Kenmore Dual Microwave Oven. The Microwave was turned on with the setting on "high". In less than 40 seconds, the polymer had cured to a colorless, odorless, hard, tack-free solid.

EXAMPLE 74

20 g of Formulation G from Example 16 was admixed with 0.2 g of 4,4'-dimethoxybenzopinacol from Example 9 in a 50 ml beaker and heated at 50° C until the pinacol had dissolved. The resulting solution was then heated to 90° C at which temperature the solution immediately exothermed to 190° C and cured to a colorless, hard, tackfree solid in less than 1 minute.

EXAMPLE 75

0.16 g of commercially available benzopinacol was dissolved in 10 g of commercially available trimethylolpropane trimethacrylate followed by the addition of 5.6 g of commercially available pentaerythritol tetrakis β-mercaptopropionate. The mixture was heated to 85° C whereat it exothermed and cured to a hard, tack-free solid.

EXAMPLE 76

Example 75 was repeated except that 11.2 g of commercially available pentaerythritol tetrakis β-mercaptopropionate and 0.21 g of commercially available benzopinacol were used. The mixture was heated to 85° C whereat it exothermed and cured to a hard, tack-free solid.

EXAMPLE 77

The composition of Example 18 was coated as a 10 mil thick film onto a vinyl asbestos floortile which had been preheated to 140° in an oven. The thus coated tile was returned to the oven maintained at 140° C. After one minute the coating was completely cured to a hard solid.

If one desired, these catalysts may be used to effect partial heat cure of a material followed by total cures by means of U.V. radiation without the addition of any photoinitiator. The following example demonstrates this process.

EXAMPLE 78

Using the composition of Example 18, a 10 mil thick coating thereof was placed on an aluminum substrate and the thus coated substrate was put on a hot plate maintained at 120° C. After four minutes the film was removed from the hot plate in a partially cured condition and subjected to U.V. radiation from an Ascor Addalux printing lamp, Polymer Type 3650 Ang., SKW, Berky Photo, Inc., equipped with a filter which removes radiation below 3,000 Ang. The lamp was situated 2 feet from the surface of the curable composition. After a 1½ minute exposure, the composition was completely cured to a hard solid and tack-free coating.

As shown in Table I, Examples 43–46, it is also possible to thicken the mixtures to a pregellation, i.e. uncured, stage even though the functionality of the unsaturated carbon-to-carbon bonds in the ethylenically unsaturated compound and the thiol group in the polythiol have a combined functionality greater than four. For example, in the examples mentioned, diallyl phthalate contains two unsaturated carbon-to-carbon bonds per molecule and the polythiol, i.e. pentaerythritol tetrakis -mercaptopropionate, contains four thiol groups per molecule. These materials with a pinacol catalyst can be heated for a very short time period to initiate the reaction between the ethylenically unsaturated compounds and the polythiol and then removed from the heat thereby stopping the reaction at a pregellation stage. The resultant thermoplastic product has an increase viscosity over the original admixture.

The pinacol catalyst can be added to the system in various ways. That is, the pinacol catalyst, per se, can be admixed with either the ethylenically unsaturated compound or the polythiol or mixtures thereof. Additionally, it can be comelted with a photosensitizer and added to the ethylenically unsaturated compound and polythiol in the case where U.V. radiation is employed. Furthermore, the pinacol catalyst can be dissolved in well known commercially available solvents such as ketones, e.g., actone and methylethyl ketone or chlorinated hydrocarbons such as methylene chloride, and then added to the system.

The products resulting from the instant invention have many and varied uses. Examples of some uses include but are not limited to adhesives; caulks; elastomeric sealants; coatings, encapsulating or potting compounds; liquid castable elastomers; thermoset resins; impregnants for fabric cloth, fibrous webs and other porous substrates; laminating adhesives and coatings, mastics; glazing compounds; fiberglass reinforced composites; sizing or surface finishing agents, filleting compounds, cure in place gasketing compounds; foamable thermosetting, photoresist, printing plates, resins or elastomers; molded articles such as gaskets, diaphragms, etc. Substrates which can be coated with the composition of the instant invention include, but are not limited to, plastics such as Mylar, polyethylene and the like; metals such as copper, aluminum, steel and the like; wood; concrete blocks; brick; vinyl and asbestos floor coverings; ceramics; glass; paper and cardboard and the like.

We claim:

1. A heat activatable composition comprising an ethylenically unsaturated compound, a polythiol, the mole ratio of the carbon-to-carbon double bonds in the ethylenically unsaturated compound to the thiol groups in the polythiol being in the range of 1:10 to 10:1 respectively, and 0.01–5% by weight based on the weight of the ethylenically unsaturated compound and polythiol of a pinacol of the general formula:

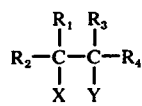

wherein $R_1$ and $R_3$ are members independently selected from the group consisting of a substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy.

2. The composition of claim 1 containing in addition 0.0005 to 30% by weight of a photosensitizer based on the weight of the ethylenically unsaturated compound and the polythiol.

3. The composition according to claim 1 wherein the pinacol is benzopinacol.

4. The composition of claim 1 as a coating on a substrate.

5. The process of forming an adduct which comprises admixing a composition comprising a mono-ethylenically unsaturated compound with a polythiol containing at least two thiol groups, and 0.01–5% by weight based on the weight of the mono-ethylenically unsaturated compound and the polythiol of a pinacol of the general formula:

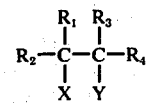

wherein $R_1$ and $R_3$ are members independently selected from the group consisting of substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy; and, thereafter, heating said composition to a temperature in the range 50°–250° C for a time sufficient to cause the unsaturated carbon-to-carbon bond in the mono-ethylenically unsaturated compound to react with a thiol group in the polythiol.

6. The process of forming a chain-extended polythioether which comprises admixing a composition comprising an ethylenically unsaturated compound containing two unsaturated carbon-to-carbon double bonds, a polythiol containing two SH groups per molecule, the mole ratio of the carbon-to-carbon double bonds in the ethylenically unsaturated compound to the thiol groups in the polythiol being 1:1 respectively, and 0.01–5% by weight based on the weight of the ethylenically unsaturated compound and the polythiol of a pinacol of the general formula:

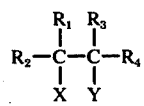

wherein $R_1$ and $R_3$ are members independently selected from the group consisting of substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy; and, thereafter, heating said composition to a temperature in the range 50°–250° C for a time sufficient to cause the unsaturated carbon-to-carbon bonds in the ethylenically unsaturated compound to react with the thiol groups in the polythiol.

7. The process of forming a cured polythioether which comprises admixing a composition comprising an ethylenically unsaturated compound containing at least two unsaturated carbon-to-carbon bonds per molecule, a polythiol containing at least two thiol groups per molecule, the total functionality of the unsaturated carbon-to-carbon bonds per molecule in the ethylenically unsaturated compound and the thiol groups per molecule in the polythiol being greater than four and 0.01–5% by weight based on the weight of the ethylenically unsaturated compound and the polythiol of a pinacol of the general formula:

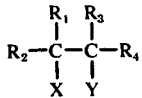

wherein $R_1$ and $R_3$ are members independently selected from the group consisting of substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy; and, thereafter, heating said composition to a temperature in the range 50°–250° C for a time sufficient to obtain a cured polythioether.

8. The process of thickening a composition which comprises admixing a composition comprising an ethylenically unsaturated compound containing at least two unsaturated carbon-to-carbon bonds per molecule, a polythiol containing at least two thiol groups per molecule, the total functionality of the unsaturated carbon-to-carbon bonds per molecule in the ethylenically unsaturated compound and the thiol groups per molecule in the polythiol being greater than four and 0.01–5% by weight based on the weight of the ethylenically unsaturated compound and the polythiol of a pinacol of the general formula:

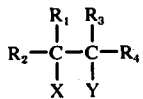

wherein $R_1$ and $R_3$ are members independently selected from the group consisting of substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy; and, thereafter, heating said composition to a temperature in the range 50°–250° C for a time sufficient to increase the viscosity of the composition to a pregellation stage.

9. The process of forming a cured polythioether coating on a substrate which comprises admixing a composition comprising an ethylenically unsaturated compound containing at least two unsaturated carbon-to-carbon bonds per molecule, a polythiol containing at least two thiol groups per molecule, the total functionality of the unsaturated carbon-to-carbon bonds per molecule in the ethylenically unsaturated compound and the thiol groups per molecule in the polythiol being greater than four and 0.01–5% by weight based on the weight of the ethylenically unsaturated compound and the polythiol of a pinacol of the general formula:

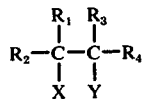

wherein $R_1$ and $R_3$ are members independently selected from the group consisting of substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy, applying said admixture to a substrate as a coating having a thickness in the range of 0.001 – 100 mils, and, thereafter, heating the composition to a temperature in the range of 50°–250° C for a time sufficient to obtain a cured polythioether coating.

10. The process of forming a cured polythioether which comprises admixing a composition comprising an ethylenically unsaturated compound containing at least two unsaturated carbon-to-carbon bonds per molecule, a polythiol containing at least two thiol groups per molecule, the total functionality of the unsaturated carbon-to-carbon bonds per molecule in the ethylenically unsaturated compound and the thiol groups per molecule in the polythiol being greater than four, a photosensitizer, and 0.01–5% by weight based on the weight of the ethylenically unsaturated compound and the polythiol of a pinacol of the general formula:

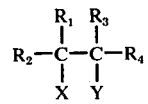

wherein $R_1$ and $R_3$ are members independently selected from the group consisting of substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy; exposing said composition to U.V. radiation having an intensity in the range 0.0004 to 60.0 watts/cm² in the 250–400 nanometer region and, thereafter, heating the composition to a temperature in the range 50°–250° C for a time sufficient to obtain a cured polythioether.

11. The process of forming a cured polythioether which comprises admixing a composition comprising an ethylenically unsaturated compound containing at least two unsaturated carbon-to-carbon bonds per molecule, a polythiol containing at least two thiol groups per molecule, the total functionality of the unsaturated carbon-to-carbon bonds per molecule in the ethylenically unsaturated compound and the thiol groups per molecule in the polythiol being greater than four and 0.01–5% by weight based on the weight of the ethylenically unsaturated compound and the polythiol of a pinacol of the general formula:

$$R_2-\underset{\underset{X}{|}}{\overset{\overset{R_1}{|}}{C}}-\underset{\underset{Y}{|}}{\overset{\overset{R_3}{|}}{C}}-R_4$$

wherein $R_1$ and $R_3$ are members independently selected from the group consisting of substituted and unsubstituted aromatic radicals, $R_2$ and $R_4$ are members independently selected from the group consisting of substituted and unsubstituted aliphatic and aromatic radicals and X and Y are members independently selected from the group consisting of hydroxyl, alkoxy and aryloxy; heating the composition to a temperature in the range 50°–250° C and, thereafter, exposing said composition to U.V. radiation having an intensity in the range 0.0004 to 60.0 watts/cm² in the 250–400 nanometer region for a time sufficient to obtain a cured polythioether.

* * * * *

UNITED STATES PATENT AND TRADEMARK OFFICE
CERTIFICATE OF CORRECTION

PATENT NO. : 4,020,233
DATED : April 26, 1977
INVENTOR(S) : Charles R. Morgan

It is certified that error appears in the above-identified patent and that said Letters Patent are hereby corrected as shown below:

In the Claims:

In Claim 1, column 21, line 43, add the word --the-- before "polythiol".

In Claim 1, column 21, line 53, delete the word "a" before "substituted".

Signed and Sealed this thirtieth Day of August 1977

[SEAL]

Attest:

RUTH C. MASON
Attesting Officer

C. MARSHALL DANN
Commissioner of Patents and Trademarks